United States Patent Office 3,294,176
Patented Dec. 27, 1966

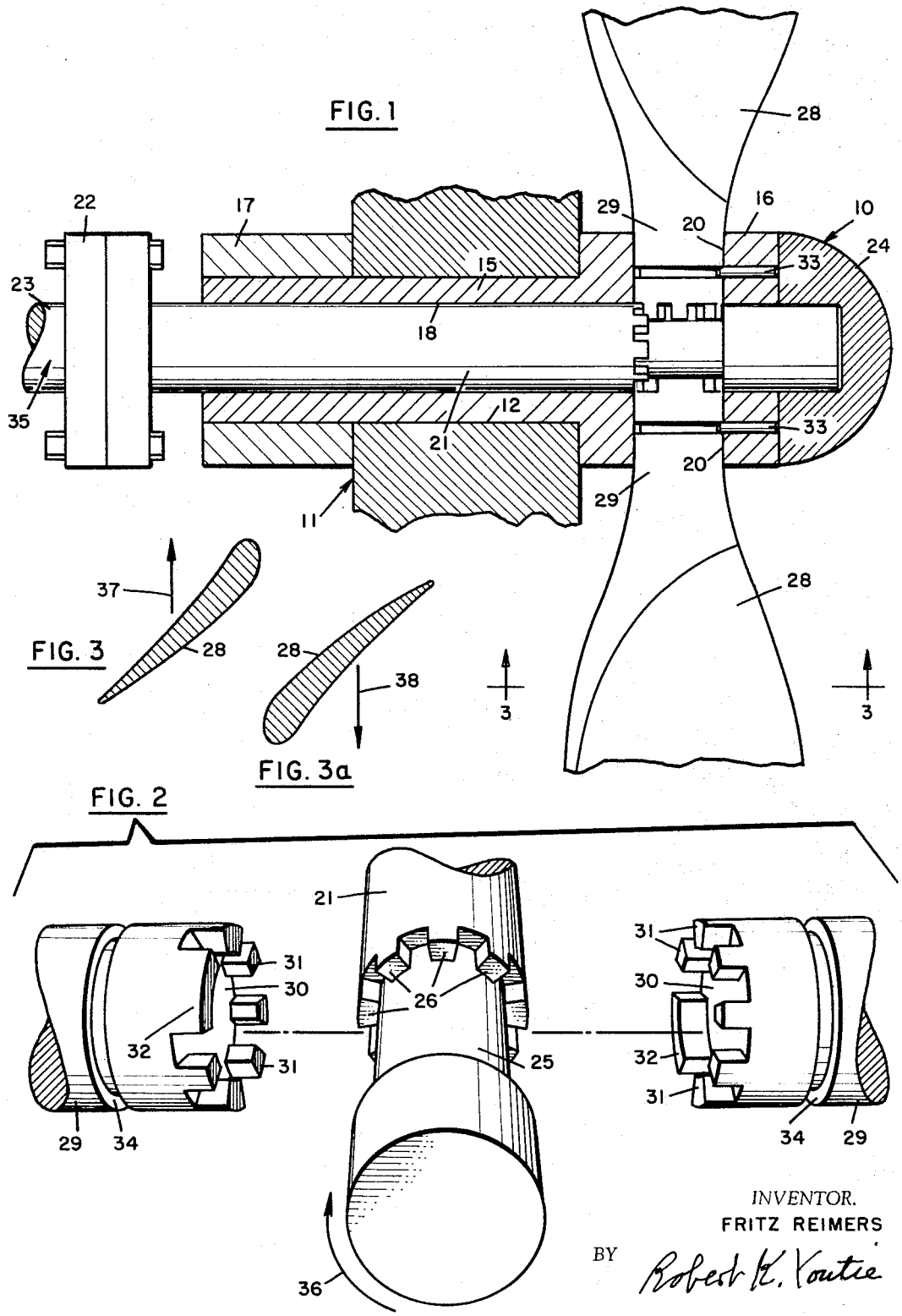

3,294,176
CHANGEABLE-PITCH PROPELLER
Fritz Reimers, Mont Clare, Pa. 19453
Filed Apr. 11, 1966, Ser. No. 542,407
3 Claims. (Cl. 170—160.1)

This invention relates generally to changeable-pitch propellers, and is especially concerned with a unique mechanism therefor.

As is well known to those versed in the art, changeable-pitch propellers, as for aviation and marine use have been the subject of much research and development. However, proposed changeable-pitch-propeller constructions have not been entirely satisfactory, having in the past required relatively complex and expensive mechanisms, of extremely high cost and readily subject to malfunction and damage.

Accordingly, it is an important object of the present invention to provide a changeable-pitch propeller construction which is extremely simple in design, capable of economic manufacture, maintenance and repair, and which is durable and reliable throughout a long useful life.

It is a more particular object of the present invention to provide a changeable-pitch-propeller construction, wherein reversal of propeller rotation for braking or reversing action, say of a vehicle carrying the propeller, effects a change in propeller-blade pitch so that the propeller-blade contour is effectively employed in both directions of propeller rotation.

While the device of the persent invention has been primarily developed for use with aircraft propellers, and will be illustrated and described hereinafter with particular reference thereto, it is appreciated that the inventive concept may be employed with other types of propellers, such as marine, or the like, so that reference hereinafter to airfoil blades or other terminology specific to aircraft propellers is understood as being for illustrative purposes only, without limiting intent, and is intended to apply to other suitable types of propellers.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a sectional view illustrating an assembled changeable-pitch-propeller construction in accordance with the teachings of the present invention;

FIGURE 2 is a partial exploded perspective view showing certain elements of the changeable-pitch-propeller construction of FIGURE 1;

FIGURE 3 is a sectional view taken generally along the line 3—3 of FIGURE 1 illustrating propeller rotation in one direction; and FIGURE 3a is a view similar to FIGURE 3, but illustrating propeller rotation in the other direction.

Referring now more particularly to the drawings, and specifically to FIGURE 1 thereof, a propeller assembly is there generally designated 10, and illustrated as being mounted in a support structure 11 having a journal bearing 12.

More particularly, the propeller assembly 10 includes an elongate, hollow outer shaft 15 extending through the support structure 11 and rotatably journaled in the bearing 12. The forward or outer end of the hollow outer shaft 15 may be enlarged, as at 16, rightward of the mounting structure 11 as seen in FIGURE 1. On the inner, leftward end of outer shaft 15 may be circumposed a collar 17 for retaining the shaft 15 in the bearing 12.

Extending coaxially through the outer shaft 15 is a bore 18, which opens through opposite ends of the shaft and defines an internal hollow therethrough. The enlarged outer-end portion 16 of shaft 15 may be provided with a plurality of radially extending thru openings or holes 20, each opening at its radially inner end into the hollow or bore 18 of the outer shaft 15. While a pair of radially extending openings 20 are shown in the illustrated embodiment, it is appreciated that a greater number may be provided, if desired.

An inner shaft 21 extends coaxially through the outer shaft 15, being rotatably journaled in the bore 18 of the outer shaft. The inner shaft 21 may have its opposite ends projecting beyond opposite ends of the outer shaft 15, the inner end of inner shaft 21 being adapted for coupling, as at 22, to a reversible drive source, as by a reversible drive shaft 23. The forward or outer end of inner shaft 21 may project beyond the forward-end enlargement 16 of shaft 15, and may there be provided with a fairing cap or retainer head 24 having its external surface configured for smooth surface mergence with the external surface of outer-shaft enlargement 16.

Spaced between the ends of inner shaft 21, the inner shaft may be provided with a circumferential recess or groove 25, best seen in FIGURE 2. The recess or groove 25 may be formed, at least at one end thereof, with a circumferentially castellated or toothed formation, say to define teeth 26. In the illustrated embodiment, the teeth 26 are formed at the rear end of circumferential recess 25 extending forwardly into the recess and arranged in circumferentially spaced relation about the inner shaft 21. The teeth 26 may assume the configuration of raised bosses or lands on the recess 25 having an external diameter substantially equal to that of the shaft 21, as illustrated. As best seen in FIGURE 1, the circumferential groove 25 is located in facing relation with the openings 20 of the outer shaft 15, and the groove may be of a length longitudinally of the inner shaft approximately equal to the diameter of each opening 20, for substantial registry therewith.

Projecting radially outwardly from the enlarged end portion 16 of outer shaft 15 may be a pair of propeller blades 28. Associated with each blade 28, at the inner end thereof, is a shank 29 extending radially inward through a respective outer-shaft opening 20 and journaled therein for rotation about the axis of the respective shank. That is, each propeller-blade shank 29 extends radially inward through a respective opening 20, being rotatably journaled therein, toward the groove 25 of inner shaft 21. The shanks 29 may be of generally cylindrical configuration, each being provided on its inner end 30 with a castellated or toothed formation of teeth 31. The teeth 31 are arranged in an arcuate array circumferentially about the inner end 30 of the respective shank 29, with the teeth projecting longitudinally of the shank inward therefrom for entry into the groove 25 and interfitting engagement with the teeth 26 of the inner shaft 21. Along the circumferential path of teeth 31 there may be formed an arcuate abutment segment or land 32 for abutment and limiting engagement with the inner-shaft teeth 26.

Rotatably retaining the shanks 29 in their respective openings 20 may be any suitable retainer means, such as pins 33 extending through the outer-shaft end enlargement into circumferential grooves 34 of respective shanks.

It will now be appreciated that upon axial rotation of the inner shaft 21 relative to the outer shaft 15, the interfitting engagement of inner-shaft teeth 26 with propeller-blade-shank teeth 31 effects axial rotation of the propeller blades in the journal openings 20 to a limiting position determined by engagement of the abutments 32 with the teeth 26. Continued rotation of inner shaft 21 effects simultaneous rotation of outer shaft 15 and rotation of the propeller blades 28 about the axis of the inner shaft. Upon reversed direction of rotation of drive shaft 23, the same action occurs and terminates with the propeller blades 28 in an opposite extreme limiting position, approximately 180 degrees away from the first-described limiting position.

Assuming the drive shaft 23 to be rotating in the direction of arrow 35 in FIGURE 1, and of arrow 36 in FIGURE 2, wherein the axial rotation of shanks 29 has reached its limiting position, the propeller blades 28 will rotate in the same direction as shaft 21. This condition is shown in FIGURE 3, the propeller blade 28 moving in the direction of arrow 37 and its airfoil configuration properly arranged to effect maximum thrust for forward movement of the mounting structure 11. Upon reversal of rotation of drive shaft 23, the airfoil configuration of each blade 28 is rotated approximately 180 degrees to the condition of FIGURE 3a, and the direction of blade movement is there indicated by arrow 38. It will thus be apparent that the airfoil configuration is arranged for effective braking action upon reversal of drive shaft 23.

From the foregoing it is seen that the present invention provides a changeable-pitch propeller which is extremely simple in construction, entirely reliable in operation, and otherwise fully accomplishes its intended objects.

Although the present invention has been described in some detail by way of illustration and example for purposes of clarity of understanding, it is understood that certain changes and modifications may be made within the spirit of the invention and scope of the appended claims.

What is claimed is:

1. A changeable-pitch propeller comprising an axially rotatable hollow outer shaft having a plurality of angularly spaced radially extending thru openings located with their axes intersecting at the axis of said outer shaft, an axially rotatable inner shaft extending coaxially within said outer shaft past said openings and journaled therein for rotation with and relative to said outer shaft, said inner shaft being adapted at one end for connection to a reversible power shaft, said inner shaft having an intermediate portion formed with an annular circumferential groove opening radially outwardly into said openings and of a width approximating the diameter of said thru openings for registry therewith, a plurality of blade shanks each having a diameter approximating that of one of said thru openings and the width of said groove and extending rotatably through a respective thru opening for rotation with said shaft and rotation relative thereto about the respective axes of said openings, said blade shanks having their inner ends entering said groove, a propeller blade projecting from each of said shanks generally radially outwardly of said outer shaft, interengaging drive means on said inner shaft in the groove thereof and on the inner ends of said shanks for axially rotating the latter in opposite directions upon axial rotation in opposite directions of said inner shaft relative to said outer shaft, and limit means limiting the axial rotation of said shanks to predetermined positions in opposite directions of inner-shaft rotation relative to said outer shaft, said drive means comprising a generally circular array of shank teeth projecting from the inner end of each shank into the adjacent portion of said groove, and an annular array of inner-shaft teeth projecting from one side of said groove into meshing engagement with the teeth of said shanks.

2. A changeable-pitch propeller according to claim 1, said limit means comprising abutments in the paths of said shank teeth for abutting engagement with said shaft teeth.

3. A changeable-pitch propeller according to claim 1, said propeller blades being of airfoil configuration, and said limit means limiting axial shank rotation to approximately 180 degrees to properly present said airfoil configurations to the airstream corresponding to the direction of outer-shaft rotation.

References Cited by the Examiner

UNITED STATES PATENTS

| | | | |
|---|---|---|---|
| 913,364 | 2/1909 | Crowhurst | 170—174 |
| 1,520,746 | 12/1924 | Boyce et al. | 170—160.1 |
| 2,134,157 | 10/1938 | Thompson | 170—160.1 |
| 2,257,976 | 10/1941 | Moorman | 170—160.1 |
| 2,869,648 | 1/1959 | Pihl | 170—160.1 |

FOREIGN PATENTS

| | | |
|---|---|---|
| 850,857 | 9/1952 | Germany. |
| 358,771 | 4/1938 | Italy. |

MARTIN P. SCHWADRON, *Primary Examiner.*

EVERETTE A. POWELL, JR., *Examiner.*